(12) United States Patent
Wen et al.

(10) Patent No.: US 9,323,796 B2
(45) Date of Patent: Apr. 26, 2016

(54) DATA PARTITIONING METHOD AND APPARATUS

(71) Applicant: Huawei Technologies Co., Ltd., Shenzhen (CN)

(72) Inventors: Yu Wen, Shenzhen (CN); Haoyang Che, Beijing (CN); Yong Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 195 days.

(21) Appl. No.: 14/297,968

(22) Filed: Jun. 6, 2014

(65) Prior Publication Data

US 2014/0365492 A1 Dec. 11, 2014

Related U.S. Application Data

(63) Continuation of application No. PCT/CN2014/071039, filed on Jan. 22, 2014.

(30) Foreign Application Priority Data

Jun. 7, 2013 (CN) .......................... 2013 1 0226045

(51) Int. Cl.
G06F 17/30 (2006.01)
G06F 7/00 (2006.01)

(52) U.S. Cl.
CPC .... G06F 17/30312 (2013.01); G06F 17/30592 (2013.01); *G06F 17/30286* (2013.01); *G06F 17/30539* (2013.01); *G06F 17/30595* (2013.01)

(58) Field of Classification Search
CPC .................. G06F 17/30592; G06F 17/30595; G06F 17/30539; G06F 17/30286
USPC ........................................................ 707/737
See application file for complete search history.

(56) References Cited

U.S. PATENT DOCUMENTS 7,814,080 B1 * 10/2010 Luo ................... G06F 17/30463
  707/687
8,849,749 B2 * 9/2014 Rishel ........................... 707/609
(Continued)

FOREIGN PATENT DOCUMENTS

CN 101145158 A 3/2008
CN 101876983 A 11/2010
(Continued)

OTHER PUBLICATIONS

Jidnal, A., et al., "The Mimicking Octopus: Towards a one-size-fits-all Database Architecture," 5th Biennial Conference on Innovative Data Systems Research, Jan. 12, 2011, 6 pages.
(Continued)

*Primary Examiner* — Kuen Lu
(74) *Attorney, Agent, or Firm* — Conley Rose, P.C.; Grant Rodolph

(57) ABSTRACT

A data partitioning method and apparatus. The method includes: determining tuple relationship information according to received mixed loads and structure information of a database; determining tuple split cost information according to the tuple relationship information and a feature about whether the mixed loads are executable in parallel; obtaining multiple partitioning schemes according to the tuple split cost information, and determining, from the partitioning schemes, a partitioning scheme with a minimum total cost value as an optimum partitioning scheme to perform partitioning processing on data stored in the database. In the data partitioning method and apparatus, optimum partitioning is performed on data associated with the mixed loads in a database, after partitioning, data has features of a transaction load and an analytical load in the mixed loads, thereby improving working performance of the database system oriented to the mixed loads.

21 Claims, 7 Drawing Sheets

(56) References Cited

U.S. PATENT DOCUMENTS 9,031,994 B1 * 5/2015 Cao .................. G06F 17/30958
707/798
2010/0281027 A1 11/2010 Duan et al.

FOREIGN PATENT DOCUMENTS

| CN | 101896983 A | 11/2010 |
| CN | 102799628 A | 11/2012 |

OTHER PUBLICATIONS

Foreign Communication From a Counterpart Application, PCT Application No. PCT/CN2014/071039, International Search Report dated May 5, 2014, 7 pages.

Foreign Communication From a Counterpart Application, PCT Application No. PCT/CN2014/071039, Written Opinion dated May 5, 2014, 5 pages.

* cited by examiner

DATA PARTITIONING METHOD AND APPARATUS

CROSS-REFERENCE TO RELATED APPLICATIONS

This application is a continuation of International Application No. PCT/CN2014/071039, filed on Jan. 22, 2014, which claims priority to Chinese Patent Application No. 201310226045.6, filed on Jun. 7, 2013, all of which are hereby incorporated by reference in their entireties.

TECHNICAL FIELD

The present invention relates to the field of database technologies, and in particular, to a data partitioning method and apparatus.

BACKGROUND

Traditional relational database systems are classified, according to different loads to which they are oriented, into database systems used for on-line transaction processing (OLTP) and database systems used for on-line analytical processing (OLAP). A load to which a database system used for OLTP is oriented is called a transaction load, and a load to which a database system used for OLAP is oriented is called an analytical load. Correspondingly, the two different database systems manage data in databases in different manners. Specifically, because access types involved by the transaction load include data query and data modification (including data update, modification, insertion, deletion, and the like), the database system oriented to the transaction load should perform centralized control on related data to avoid distributing the data in different areas of a database and affecting data access efficiency. Access types involved by the analytical load are mainly read-only query requests, and each query request usually involves scanning, statistics, and analysis of a large amount of data. Therefore, the database system oriented to the analytical load should store data in different partitions, so that data access can be performed in parallel in multiple areas, thereby improving data access efficiency. A user needs to concurrently maintain the two database systems. However, with continuous increase of the data amount and system complexity, concurrent maintenance of the two systems increases burdens on the user. Therefore, a database system that can be oriented to mixed loads (that is, concurrently oriented to the transaction load and the analytical load) is developed in response to user requirements.

To ensure data access efficiency in the database system oriented to the mixed loads, data in the database needs to be partitioned according to features of both the transaction load and the analytical load. In the prior art, a data partitioning method in a database system is mainly performed by an on-line analytical processing system, for example, data partitioning is performed using a hash function according to hash values of one or several fields in a relational table of the database.

A data partitioning scheme obtained using the foregoing method facilitates processing of the analytical load, but this data partitioning scheme is unsatisfactory for the transaction load, and affects processing efficiency of the transaction load, thereby reducing working performance of the database system oriented to the mixed loads.

SUMMARY

The present invention provides a data partitioning method and apparatus to improve working performance of a database oriented to mixed loads.

According to a first aspect, an embodiment of the present invention provides a data partitioning method, which includes: receiving mixed loads and structure information of a database that are input by a user, where the mixed loads include at least one transaction load and/or at least one analytical load, and the structure information of the database includes at least one tuple associated with the mixed loads; determining tuple relationship information according to the mixed loads and the structure information of the database, where the tuple relationship information includes a transaction correlation between any two tuples in the structure information of the database; determining tuple split cost information according to the tuple relationship information and a feature about whether the mixed loads are executable in parallel, where the tuple split cost information includes a split cost between any two tuples having a transaction correlation in the structure information of the database, and the split cost is used to indicate a degree of an impact on efficiency of the mixed loads in accessing the two tuples having the transaction correlation when the two tuples having the transaction correlation are stored in different partitions; obtaining multiple partitioning schemes according to the tuple split cost information, and determining, from the partitioning schemes, a partitioning scheme with a minimum total cost value as an optimum partitioning scheme, where a total cost value of each partitioning scheme is a sum of split costs between tuples having transaction correlations in the structure information of the database when the partitioning scheme is used; and performing, according to the optimum partitioning scheme, partitioning processing on data stored in the database.

With reference to the first aspect, in a first implementation manner, the determining tuple relationship information according to the mixed loads and the structure information of the database includes: separately determining, according to each load included in the mixed loads, all tuples associated with the each load, in the structure information of the database; determining, according to a transaction correlation between any two tuples of all tuples associated with each load, relationship sub-information between tuples associated with the load; and gathering relationship sub-information between tuples associated with each load in the mixed loads to obtain the tuple relationship information.

With reference to the first implementation manner of the first aspect, in a second implementation manner, the determining tuple split cost information according to the tuple relationship information and a feature about whether the mixed loads are executable in parallel includes, when the feature is that the mixed loads which are associated with two tuples having a transaction correlation in the tuple relationship information are not executable in parallel, determining that a split cost between the two tuples is a preset positive value; and when the feature is that the mixed loads which are associated with two tuples having a transaction correlation in the tuple relationship information are executable in parallel determining that a split cost between the two tuples is a preset negative value.

With reference to the second implementation manner of the first aspect, in a third implementation manner, the tuple split cost information is represented by a relationship diagram and any two tuples having a transaction correlation in the relationship diagram are connected by a connection line; and the obtaining multiple partitioning schemes according to the tuple split cost information, and determining, from the partitioning schemes, a partitioning scheme with a minimum total cost value as an optimum partitioning scheme include: performing multiple types of segmentation processing on the relationship diagram using an image segmentation algorithm to determine multiple partitioning schemes, where each type of segmentation processing corresponds to one partitioning scheme; when each type of segmentation processing is performed on the relationship diagram, accumulating split costs between two tuples which are connected by each segmented connection line, to obtain a total cost value of a partitioning scheme corresponding to this type of segmentation processing; and determining a partitioning scheme corresponding to a minimum total cost value as an optimum partitioning scheme.

With reference to the second implementation manner of the first aspect, in a fourth implementation manner, after partitioning processing is performed on the data in the database according to the optimum partitioning scheme, the method further includes, when the tuple split cost information is updated to adjusted tuple split cost information, performing multiple types of segmentation processing on the adjusted tuple split cost information using the image segmentation algorithm to determine multiple partitioning schemes, where each type of segmentation processing corresponds to one partitioning scheme, and determining a total cost value of each partitioning scheme, where the adjusted tuple split cost information is represented by a relationship diagram, and any two tuples having a transaction correlation in the relationship diagram are connected by a connection line; determining a partitioning scheme corresponding to a minimum total cost value as a first partitioning scheme; and generating tuple movement cost information according to the optimum partitioning scheme and the first partitioning scheme, and determining an adjusted partitioning scheme according to the tuple movement cost information.

With reference to the fourth implementation manner of the first aspect, in a fifth implementation manner, the generating tuple movement cost information according to the optimum partitioning scheme and the first partitioning scheme, and determining an adjusted partitioning scheme according to the tuple movement cost information include, when the optimum partitioning scheme is adjusted according to the first partitioning scheme, determining a tuple to be moved in each optimum partition, where the optimum partition is a storage area determined according to the optimum partitioning scheme; determining a movement cost between the tuple to be moved and the optimum partition according to an adjustment relationship between the tuple to be moved and the optimum partition; determining a split cost between the tuple to be moved and the optimum partition according to the adjusted tuple split cost information; generating tuple movement cost information according to the movement cost and the split cost; adjusting the optimum partitioning scheme according to the tuple movement cost information to obtain multiple preset movement partitioning schemes; obtaining an adjusted total cost value corresponding to each of the preset movement partitioning schemes using the image segmentation algorithm; and determining, from the multiple preset movement partitioning schemes, a preset movement partitioning scheme with a minimum adjusted total cost value as the adjusted partitioning scheme.

With reference to the first aspect, or any one of the first implementation manner to the third implementation manner of the first aspect, in a sixth implementation manner, if partitioning processing on the data in the database according to the optimum partitioning scheme fails, the method further includes: performing data partitioning using at least two on-line analytical processing modes to obtain candidate partitioning schemes corresponding to each of the on-line analytical processing modes; determining difference values between each candidate partitioning scheme and the optimum partitioning scheme; and determining a candidate partitioning scheme with a minimum difference value as a current partitioning scheme, and performing partitioning on the data according to the current partitioning scheme.

With reference to the sixth implementation manner of the first aspect, in a seventh implementation manner, the at least two on-line analytical processing modes include at least two of the following on-line analytical processing modes: hash function processing, permutation function processing, round-robin algorithm processing, and replica management processing.

According to a second aspect, an embodiment of the present invention provides a data partitioning apparatus, which includes: a receiving module configured to receive mixed loads and structure information of a database that are input by a user, where the mixed loads include at least one transaction load and/or at least one analytical load, and the structure information of the database includes at least one tuple associated with the mixed loads; a relationship determining module configured to determine tuple relationship information according to the mixed loads and the structure information of the database, where the tuple relationship information includes a transaction correlation between any two tuples in the structure information of the database; a cost determining module configured to determine tuple split cost information according to the tuple relationship information and a feature about whether the mixed loads are executable in parallel, where the tuple split cost information includes a split cost between any two tuples having a transaction correlation in the structure information of the database, and the split cost is used to indicate a degree of an impact on efficiency of the mixed loads in accessing the two tuples having the transaction correlation when the two tuples having the transaction correlation are stored in different partitions; an optimum selecting module configured to obtain multiple partitioning schemes according to the tuple split cost information, and determine, from the partitioning schemes, a partitioning scheme with a minimum total cost value as an optimum partitioning scheme, where a total cost value of each partitioning scheme is a sum of split costs between tuples having transaction correlations in the structure information of the database when the partitioning scheme is used; and a partitioning module configured to perform, according to the optimum partitioning scheme, partitioning processing on data stored in the database.

With reference to the second aspect, in a first implementation manner, the relationship determining module is configured to separately determine, according to each load included in the mixed loads, all tuples associated with the each load, in the structure information of the database; determine, according to a transaction correlation between any two tuples of all tuples associated with each load, relationship sub-information between tuples associated with the load; and gather relationship sub-information between tuples associated with each load in the mixed loads to obtain the tuple relationship information.

With reference to the first implementation manner of the second aspect, in a second implementation manner, the cost determining module is configured to, when the feature is that the mixed loads which are associated with two tuples having a transaction correlation in the tuple relationship information are not executable in parallel, determine that a split cost between the two tuples is a preset positive value; and when the feature is that the mixed loads which are associated with two tuples having a transaction correlation in the tuple relationship information are executable in parallel determine that a split cost between the two tuples is a preset negative value.

With reference to the second implementation manner of the second aspect, in a third implementation manner, the tuple split cost information is represented by a relationship diagram and any two tuples having a transaction correlation in the relationship diagram are connected by a connection line; and the optimum selecting module is configured to perform multiple types of segmentation processing on the relationship diagram using an image segmentation algorithm to determine multiple partitioning schemes, where each type of segmentation processing corresponds to one partitioning scheme; when each type of segmentation processing is performed on the relationship diagram, accumulate split costs between two tuples which are connected by each segmented connection line, to obtain a total cost value of a partitioning scheme corresponding to this type of segmentation processing; and determine a partitioning scheme corresponding to a minimum total cost value as an optimum partitioning scheme.

With reference to the second implementation manner of the second aspect, in a fourth implementation manner, the apparatus further includes an adjustment selecting module, which is configured to, after the partitioning module performs partitioning processing on the data in the database according to the optimum partitioning scheme, when the tuple split cost information is updated to adjusted tuple split cost information, perform multiple types of segmentation processing on the adjusted tuple split cost information using the image segmentation algorithm to determine multiple partitioning schemes, where each type of segmentation processing corresponds to one partitioning scheme, and determine a total cost value of each partitioning scheme, where the adjusted tuple split cost information is represented by a relationship diagram, and any two tuples having a transaction correlation in the relationship diagram are connected by a connection line; determine a partitioning scheme corresponding to a minimum total cost value as a first partitioning scheme; and generate tuple movement cost information according to the optimum partitioning scheme and the first partitioning scheme, and determine an adjusted partitioning scheme according to the tuple movement cost information.

With reference to the fourth implementation manner of the second aspect, in a fifth implementation manner, the adjustment selecting module is configured to, when the optimum partitioning scheme is adjusted according to the first partitioning scheme, determine a tuple to be moved in each optimum partition, where the optimum partition is a storage area determined according to the optimum partitioning scheme; determine a movement cost between the tuple to be moved and the optimum partition according to an adjustment relationship between the tuple to be moved and the optimum partition; determine a split cost between the tuple to be moved and the optimum partition according to the tuple split cost information; generate tuple movement cost information according to the movement cost and the split cost; adjust the optimum partitioning scheme according to the tuple movement cost information to obtain multiple preset movement partitioning schemes; obtain an adjusted total cost value corresponding to each of the preset movement partitioning schemes using the image segmentation algorithm; and determine, from the multiple preset movement partitioning schemes, a preset movement partitioning scheme with a minimum adjusted total cost value as the adjusted partitioning scheme.

With reference to the second aspect, or any one of the first implementation manner to the third implementation manner of the second aspect, in a sixth implementation manner, the apparatus further includes a difference selecting module configured to, when the partitioning module fails to perform partitioning processing on the data in the database according to the optimum partitioning scheme, perform data partitioning using at least two on-line analytical processing modes to obtain candidate partitioning schemes corresponding to each of the on-line analytical processing modes; determine difference values between each candidate partitioning scheme and the optimum partitioning scheme; and determine a candidate partitioning scheme with a minimum difference value as a current partitioning scheme, and perform partitioning on the data according to the current partitioning scheme.

In the embodiments, according to a feature about whether mixed loads are executable in parallel, optimum partitioning is performed on data associated with the mixed loads in a database, where features of a transaction load and an analytical load in the mixed loads are considered in the data partitioning, so that when different loads access data in a database system, the loads can obtain higher access efficiency, thereby improving working performance of the database system oriented to the mixed loads.

BRIEF DESCRIPTION OF DRAWINGS

To describe the technical solutions in the embodiments of the present invention more clearly, the following briefly introduces the accompanying drawings required for describing the embodiments. The accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. The described embodiments are a part rather than all of the embodiments of the present invention. All other embodiments obtained by persons of ordinary skill in the art based on the embodiments of the present invention without creative efforts shall fall within the protection scope of the present invention.

Figure 1:
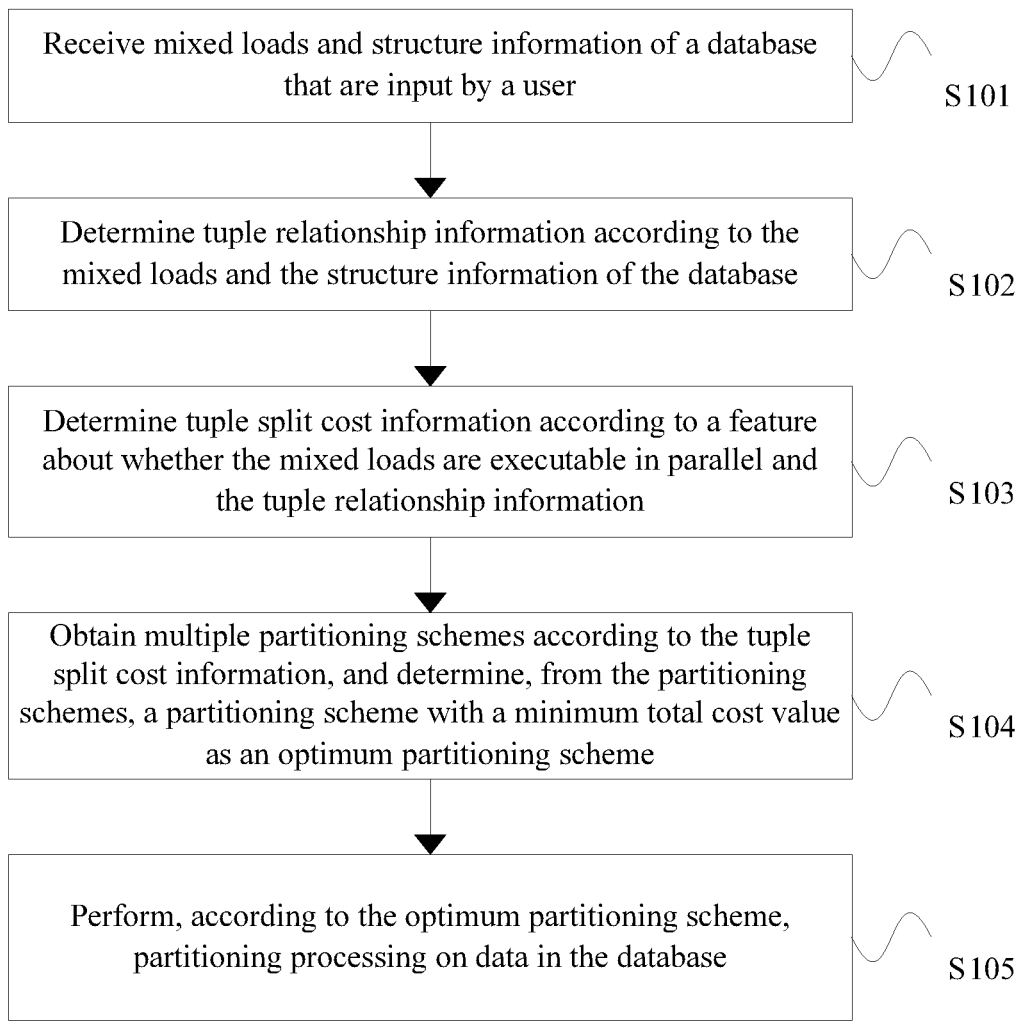
FIG. 1 is a flowchart of Embodiment 1 of a data partitioning method according to the present invention.

FIG. 1 is a flowchart of Embodiment 1 of a data partitioning method of the present invention. The method provided by this embodiment may be implemented by a data partitioning apparatus, where the apparatus may be implemented using hardware and/or software. As shown in FIG. 1, the method includes:

S101. Receive mixed loads and structure information of a database that are input by a user.

The structure information of the database has been input in advance in a database system used for data management, where the structure information of the database includes a large amount of data information and relational structures between data. The data information may be test scores of each subject of students in an educational system or be clinic information of a patient in a hospital. Using the test scores of students as an example, data that records the test scores is stored according to certain relational structures between data, where these structures include a relational structure "name-number" shown in Table 1, a relational structure "number-subject-score" shown in Table 2, and the like.

TABLE 1

| Zhang Xing | 001 |
|---|---|
| Zhao Yi | 002 |

TABLE 2

| 001 | Mathematics | A |
|---|---|---|
| 001 | History | B |
| 002 | Mathematics | B |

Entries in the foregoing Table 1 and Table 2, for example, "Zhang Xing-001" in Table 1 and "001-Mathematics-A" in Table 2, are both tuples that constitute the structure information of the database, that is, tuples are data stored in the database, and these tuples are accessed by a load received by the database. For example, if a received load is "Query the mathematics score of Zhang Xing", it is found in Table 1 according to the load that a number corresponding to Zhang Xing is 001 and then it is found in Table 2 according to the entry "001-mathematics-A" that the mathematics score of Zhang Xing is A.

Because there are different types of loads, when the foregoing tuples are partitioned in the database system, features of different types of loads need to be considered to make it convenient for various loads to access the database system.

To obtain a data partitioning scheme that facilitates the access by various loads, in this embodiment, the data partitioning apparatus needs to receive mixed loads input by the user in advance or mixed loads input by the user within a period of time. The mixed loads include at least one transaction load and/or at least one analytical load, and the structure information of the foregoing database includes at least one tuple associated with the mixed loads. When tuples accessed by a transaction load are stored in the database in a centralized manner, the transaction load may have higher efficiency in accessing the database; whereas for an analytical load, if tuples accessed by the analytical load are stored in different partitions, the analytical load may have higher access efficiency.

S102. Determine tuple relationship information according to the mixed loads and the structure information of the database.

When the user inputs "Query the mathematics score and history score of Zhang Xing" and "Make statistics of subjects scored B", because load 1 "Query for the mathematics score and history score of Zhang Xing" involves query of only little data, load 1 is a transaction load; because load 2 "Make statistics of subjects scored B" involves analysis and processing of a large amount of data, load 2 is an analytical load. That is, the data partitioning apparatus receives mixed loads that include the transaction load and the analytical load.

For ease of description, in Table 1, a tuple "Zhang Xing-001" is represented by S1 and a tuple "Zhao Yi-002" is represented by S2; in Table 2, "001-mathematics-A" is represented by C1, "001-history-B" is represented by C2, and "002-mathematics-B" is represented by C3. In this case, tuples that load 1 needs to access include S1 "Zhang Xing-001" in Table 1 and C1 "001-mathematics-A" and C2 "001-history-B" in Table 2; and load 2 needs to screen out C2 "001-history-B" and C3 "002-mathematics-B" in Table 2, where based on load 1, transaction correlations exist between S1 and C1 and between S1 and C2; and based on load 2, a transaction correlation exists between C2 and C3. In this way, tuple relationship information may be determined, that is, the tuple relationship information includes a transaction correlation between any two tuples.

Figure 2A:
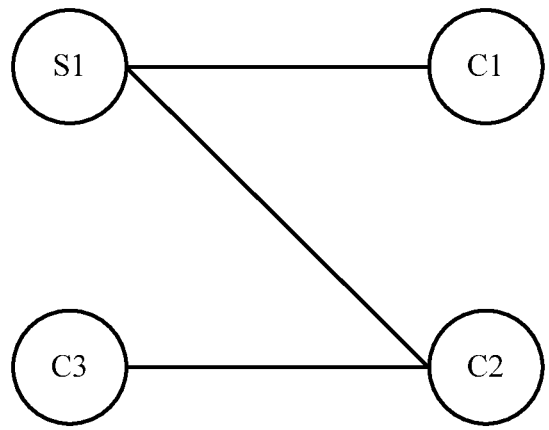
FIG. 2A is a schematic diagram of tuple relationship information according to Embodiment 1 of the present invention.

FIG. 2A is a schematic diagram of tuple relationship information in Embodiment 1 of the present invention. As shown in FIG. 2A, the tuple relationship information is represented by a relationship diagram. Each node in the tuple relationship information represents one tuple, and a connection relationship between tuples represents a transaction correlation. For example, for load 1, to know the mathematics score and history score of Zhang Xing according to C1 and C2, a number corresponding to Zhang Xing must be obtained according to S1. That is, in the tuple relationship information, transaction correlations exist between S1 and C1 and between S1 and C2, which indicates that connection relationships exist between S1 and C1 and between S1 and C2. For load 2, each tuple with score B needs to be queried, and therefore a transaction correlation exists between C2 and C3, which represents that a connection relationship exists between two nodes C2 and C3.

S103. Determine tuple split cost information according to the tuple relationship information and a feature about whether the mixed loads are executable in parallel.

The foregoing tuple split cost information includes a split cost between any two tuples having a transaction correlation in the structure information of the database, where the split cost is used to indicate a degree of an impact on efficiency of the mixed loads in accessing the two tuples having the transaction correlation when the two tuples having the transaction correlation are stored in different partitions.

For example, assuming S1 and C1 are stored in different partitions, for load 1 that accesses S1 and C1, a number corresponding to Zhang Xing must be known first in one storage area, and then scores corresponding to the number may be queried in another storage area, that is, load 1 in the mixed loads is not executable in parallel, and storing in different partitions affects access efficiency of the load. For load 2, tuples with score B only need to be accessed. When load 2 accesses the database, even if C2 and C3 are stored in different partitions, load 2 may query a tuple C2 with score B in one storage area and meanwhile may query a tuple C3 with score B in another storage area, that is, load 2 in the mixed loads is executable in parallel.

Figure 2B:
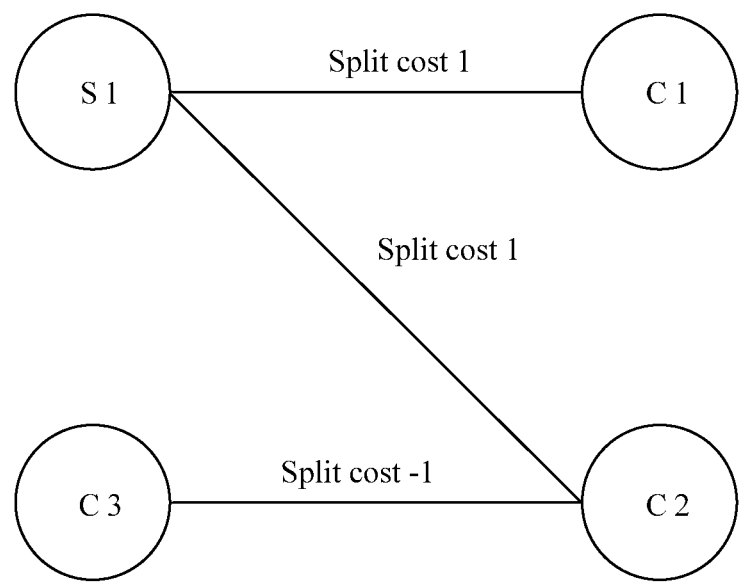
FIG. 2B is a schematic diagram of tuple split cost information according to Embodiment 1 of the present invention.

FIG. 2B is a schematic diagram of tuple split cost information in Embodiment 1 of the present invention. As shown in FIG. 2B, on the basis of the tuple relationship information shown in FIG. 2A, a split cost between any two tuples is determined in the tuple relationship information according to a feature about whether the mixed loads are executable in parallel, and the tuple split cost information is represented by a complete relationship diagram. For example, if a split cost between S1 and C1 is 1, it indicates that storing S1 and C1 in different partitions does not facilitate access by a load; and if a split cost between C2 and C3 is −1, it indicates that storing C2 and C3 in different partitions facilitates access by a load.

It should be noted that the value of the split cost in this embodiment is not limited to 1 or −1 and may be set according to a proportion of a load in the mixed loads. For example, when a quantity of access times of load 1 is far greater than a quantity of access times of load 2, for load 1 that is not executable in parallel, if tuples that need to be stored in a centralized manner are stored in different partitions, efficiency of load 1 in accessing the database is seriously affected. To obtain a proper partitioning scheme, the value of a split cost between tuples associated with load 1 may be greater than the value of a split cost between tuples associated with load 2, for example, 5, 10, and other greater values.

S104. Obtain multiple partitioning schemes according to the tuple split cost information, and determine, from the partitioning schemes, a partitioning scheme with a minimum total cost value as an optimum partitioning scheme.

The total cost value of each partitioning scheme is a sum of split costs between tuples having transaction correlations in the structure information of the database when the partitioning scheme is used. Specifically, in the foregoing partitioning scheme, it is indicated that some tuples are not to be stored in a same area, and when any two tuples having a transaction correlation are stored in different partitions according to the partitioning scheme, split costs between tuples having transaction correlations are summed to obtain a total cost value corresponding to the partitioning scheme. Details are shown in Table 3:

TABLE 3

| Scheme 1 | P1 (S1 and C1) P2 (C2 and C3) |
| Scheme 2 | P1 (S1 and C3) P2 (C1 and C2) |
| Scheme 3 | P1 (S and C2) P2 (C1 and C3) |

Using scheme 1 as an example, if data in the database is partitioned according to scheme 1, S1 and C1 need to be stored in a first area P1 while C2 and C3 need to be stored in a second area P2, so that C2 and S1 are stored in different partitions, and a split cost value 1 is generated. A sum of split costs between tuples having transaction correlations is calculated when partitioning is performed according to the partitioning scheme, to obtain a total cost value corresponding to the partitioning scheme; subsequently, total cost values corresponding to scheme 2 and scheme 3 are obtained respectively using processes similar to the process of obtaining the total cost value of scheme 1. Understandably, the total cost value is a sum of split costs between tuples having transaction correlations and the split cost is used to indicate a degree of an impact on efficiency of the mixed loads in accessing two tuples having a transaction correlation when the two tuples having the transaction correlation are stored in different partitions. Therefore, if the total cost value is greater, the partitioning scheme has a greater adverse impact on efficiency of a load in accessing the database. Therefore, a partitioning scheme with a minimum total cost value is selected as an optimum partitioning scheme.

S105. Perform, according to the optimum partitioning scheme, partitioning processing on data in the database.

In this embodiment, according to a feature about whether mixed loads are executable in parallel, optimum partitioning is performed on data associated with the mixed loads in a database, and after partitioning, data has features of a transaction load and an analytical load in the mixed loads, so that when different loads access data in a database system, the loads can obtain higher access efficiency, thereby improving working performance of the database system oriented to the mixed loads.

Figure 3:
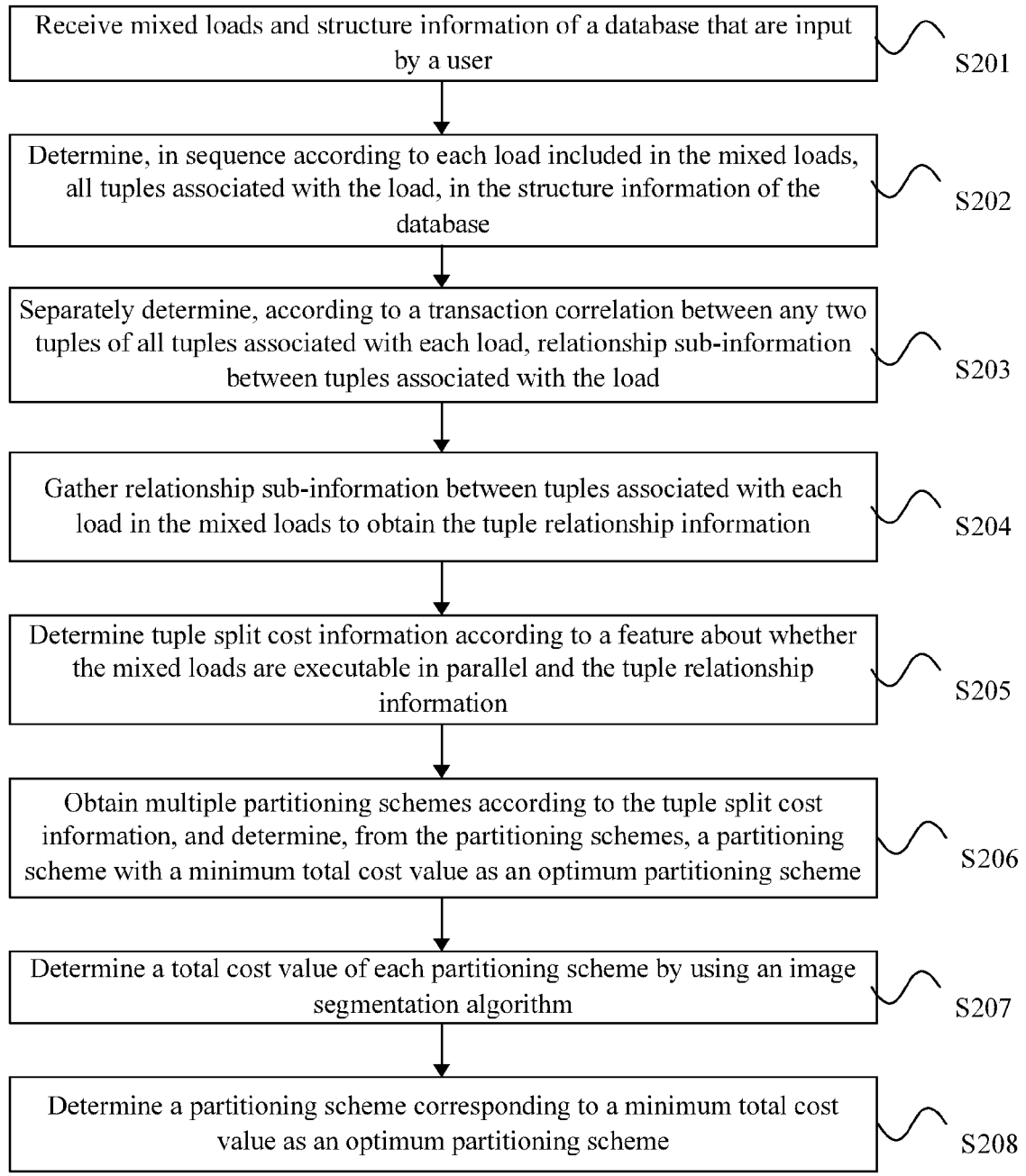
FIG. 3 is a flowchart of Embodiment 2 of a data partitioning method according to the present invention.

FIG. 3 is a flowchart of Embodiment 2 of a data partitioning method of the present invention. As shown in FIG. 3, this embodiment further describes a data partitioning method on the basis of Embodiment 1, and the method includes:

S201. Receive mixed loads and structure information of a database that are input by a user.

In the example in S102 in Embodiment 1 of the present invention, the mixed loads include multiple different loads, and the received mixed loads are an empirical model, that is, mixed loads predicted according to experience, for example, for a database storing scores of students, common access to the database by a load includes filling in scores, analyzing and calculating an average score of all students, and the like.

S202. Separately determine, in sequence according to each load included in the mixed loads, all tuples associated with the each load, in the structure information of the database.

The data partitioning apparatus analyzes the received mixed loads, and determines, in sequence according to each load included in the mixed loads, all tuples associated with the loads. Specifically, as described in the example in Embodiment 1, the data partitioning apparatus analyzes two loads, namely, load 1 and load 2 included in the mixed loads, and separately determines that all tuples associated with load 1 are S1, C1, and C2 and that all tuples associated with load 2 are C2 and C3.

S203. Determine, according to transaction correlation between any two tuples of all tuples associated with each load, relationship sub-information between tuples associated with the load.

Figure 4A:
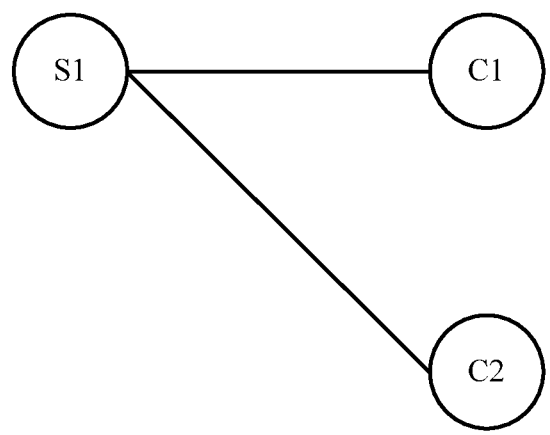
FIG. 4A is a schematic diagram of tuple relationship sub-information corresponding to load 1 according to Embodiment 2 of the present invention.
Figure 4B:
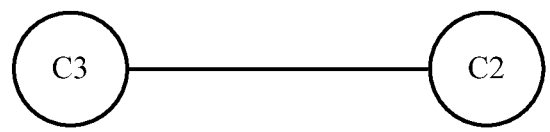
FIG. 4B is a schematic diagram of tuple relationship sub-information corresponding to load 2 according to Embodiment 2 of the present invention.

FIG. 4A is a schematic diagram of tuple relationship sub-information corresponding to load 1 in Embodiment 2 of the present invention. FIG. 4B is a schematic diagram of tuple relationship sub-information corresponding to load 2 in Embodiment 2 of the present invention. As shown in FIG. 4A, tuples associated with load 1 are S1, C1, and C2. Tuple relationship sub-information between tuples associated with load 1 is determined according to transaction correlation between the tuples. Similarly, as shown in FIG. 4B, tuple relationship sub-information between tuples associated with load 2 is determined.

This embodiment uses mixed loads that include only two loads as an example. However, in actual applications, a quantity of loads included in the mixed loads is greater and therefore multiple pieces of tuple relationship sub-information may be determined.

S204. Gather relationship sub-information between tuples associated with each load in the mixed loads to obtain the tuple relationship information.

Analysis is performed on the tuple relationship sub-information between tuples associated with each load. Using the two pieces of tuple relationship sub-information shown in FIG. 4A and FIG. 4B as an example, the two pieces of tuple relationship sub-information in FIG. 4A and FIG. 4B are combined into one piece of complete tuple relationship information shown in FIG. 2A.

S205. Determine tuple split cost information according to the tuple relationship information and a feature about whether the mixed loads are executable in parallel.

Specifically, if the feature is that the mixed loads which are associated with two tuples having a transaction correlation in the tuple relationship information are not executable in parallel, it is determined that a split cost between the two tuples is a preset positive value.

If the feature is that the mixed loads which are associated with two tuples having a transaction correlation in the tuple relationship information are executable in parallel it is determined that a split cost between the two tuples is a preset negative value.

For example, as shown in FIG. 2B, if load 1 is not executable in parallel, a split cost between S1 and C1 associated with load 1 is a positive value 1; if load 2 is executable in parallel, a split cost between C2 and C3 associated with load 2 is a negative value −1. In actual applications, the specific value may be preset according to an access frequency of a load.

S206. Obtain multiple partitioning schemes according to the tuple split cost information, and determine, from the partitioning schemes, a partitioning scheme with a minimum total cost value as an optimum partitioning scheme.

A quantity of partitioning schemes determined in S206 is at least two, for example, multiple schemes shown in Table 3.

S207. Determine a total cost value of each partitioning scheme using an image segmentation algorithm.

The foregoing tuple split cost information may be represented by a relationship diagram, for example, the relationship diagram shown in FIG. 2B. In the relationship diagram, any two tuples having a transaction correlation are connected by a connection line, where the connection line corresponds to a split cost between two tuples having the transaction correlation. In this case, multiple types of segmentation processing may be performed on the relationship diagram using the image segmentation algorithm to determine multiple partitioning schemes, where each type of segmentation processing corresponds to one partitioning scheme; and when each type of segmentation processing is performed on the foregoing relationship diagram, split costs between two tuples connected by each segmented connection line are accumulated to obtain a total cost value of a partitioning scheme corresponding to the segmentation processing. For example, to obtain scheme 1 in the foregoing Table 3, a connection line between S1 and C2 shown in FIG. 2B needs to be segmented, and a split cost between two tuples connected by the connection line is accumulated to calculate a sum of split costs between two tuples connected by multiple connection lines. Because only the connection line between S1 and C2 needs to be segmented to obtain scheme 1, a total cost value corresponding to scheme 1 is the split cost between S1 and C2.

S208. Determine a partitioning scheme corresponding to a minimum total cost value as an optimum partitioning scheme.

In this embodiment, according to a feature about whether mixed loads are executable in parallel and using an image segmentation algorithm, optimum partitioning is performed on data associated with the mixed loads in a database, and after partitioning, data has features of a transaction load and an analytical load in the mixed loads, so that when different loads access data in a database system, the loads can obtain higher access efficiency, thereby improving working performance of the database system oriented to the mixed loads.

During the use of a database, the user's requirement may change, that is, an input load is changed. For example, new load 3 is input, and tuples associated with load 3 may be S2 and C3, and one piece of tuple relationship sub-information is added. Therefore, tuple relationship information determined according to the mixed loads also needs to be changed, and data needs to be re-partitioned; or, access frequencies of some loads are changed, for example, when an optimum partitioning scheme is determined at the previous time, because an access frequency of load 1 is relatively high, the optimum partitioning scheme more facilitates access by load 1, so that efficiency of the mixed loads in accessing the database is improved. However, after the user uses the database for a period of time, and due to various reasons, a frequency at which the user inputs load 2 is far higher than a frequency at which the user inputs load 1, but the optimum data partitioning scheme does not facilitate access by load 2. Therefore, the partitioning scheme of the database needs to be adjusted, that is, after partitioning processing is performed on the data in the database according to the foregoing optimum partitioning scheme, when the tuple split cost information is updated to adjusted tuple split cost information, data partitions in the database need to be adjusted.

Figure 5:
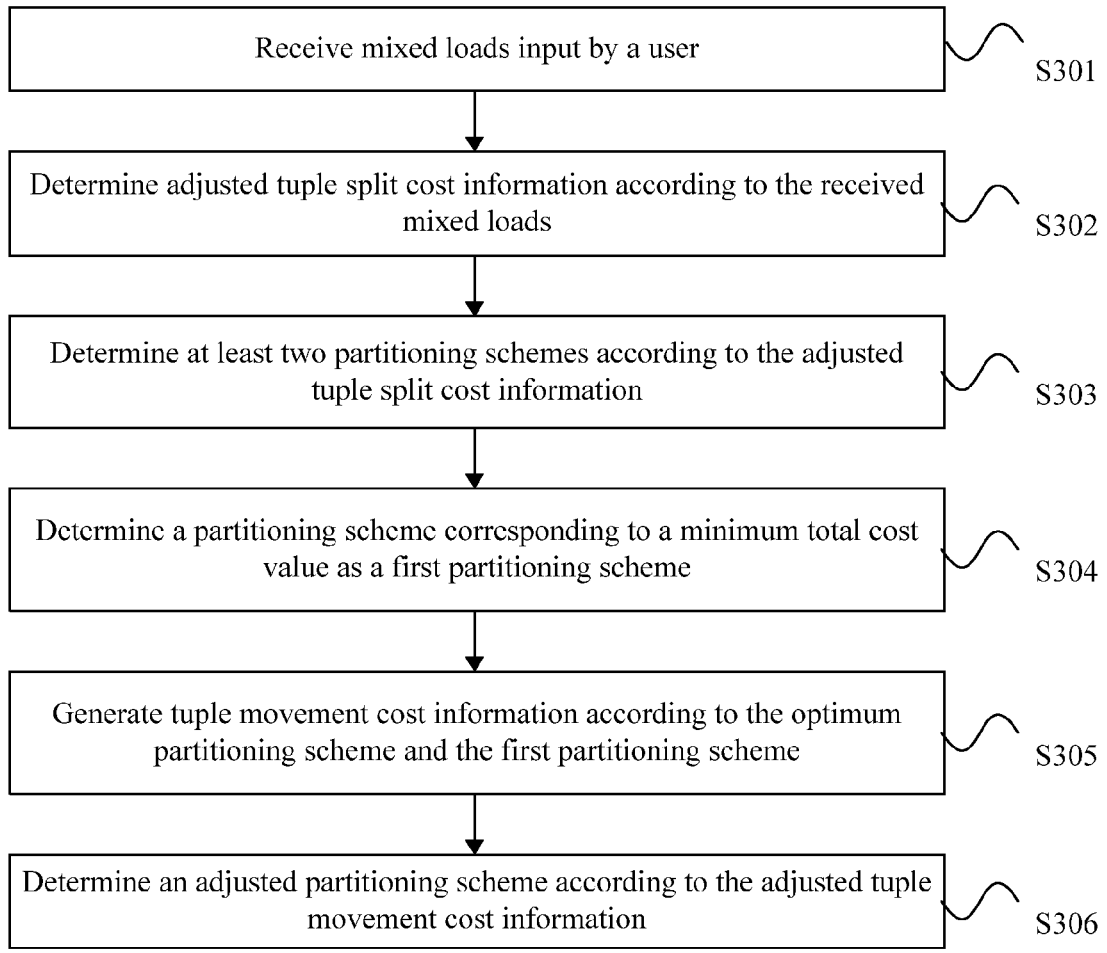
FIG. 5 is a flowchart of Embodiment 3 of a data partitioning method according to the present invention.

FIG. 5 is a flowchart of Embodiment 3 of a data partitioning method of the present invention. As shown in FIG. 5, a data partitioning method is further optimized on the basis of the foregoing Embodiment 1 or Embodiment 2. Specifically, the method includes:

S301. Receive mixed loads input by a user.

In this embodiment, mixed loads received by a data partitioning apparatus are loads input by a user within a period of time when the user uses a database system.

S302. Determine adjusted tuple split cost information according to the received mixed loads.

The adjusted tuple split cost information is obtained according to the mixed loads received by the data partitioning apparatus within a period of time and with reference to tuples in a database.

S303. Determine at least two partitioning schemes according to the adjusted tuple split cost information.

The foregoing adjusted tuple split cost information is represented by a relationship diagram. In this relationship diagram, any two tuples having a transaction correlation are connected by a connection line, that is, the adjusted tuple split cost information may also be represented by the relationship diagram shown in FIG. 2B. In this case, multiple types of segmentation processing may be performed on the adjusted tuple split cost information using an image segmentation algorithm, to determine multiple partitioning schemes, where each type of segmentation processing corresponds to one partitioning scheme, and a total cost value of each partitioning scheme is determined. For specific implementation processes of the foregoing S302 and S303, reference may be made to S201 to S206, which are not further described herein.

S304. Determine a partitioning scheme corresponding to a minimum total cost value as a first partitioning scheme.

The first partitioning scheme is a partitioning scheme with a minimum total cost value, and is determined according to the mixed loads received within a current period of time. It may be understood that the first partitioning scheme completely facilitates access by the current mixed loads.

S305. Generate tuple movement cost information according to the optimum partitioning scheme and the first partitioning scheme.

When the optimum partitioning scheme is adjusted according to the first partitioning scheme, a tuple to be moved in each optimum partition is determined, where the optimum partition is a storage area determined according to the foregoing optimum partitioning scheme. The optimum partitioning scheme uses P1 (S1 and C3) and P2 (C1 and C2) as an example, where P1 and P2 are two storage areas determined according to the optimum partitioning scheme, and the determined first partitioning scheme uses P1 (S1 and C2) and P2 (C1 and C3) as an example. When the optimum partitioning scheme is adjusted according to the first partitioning scheme, it may be known, by analyzing and comparing the optimum partitioning scheme and the first partitioning scheme, that tuples C2 and C3 need to be moved, that is, C2 and C3 are tuples to be moved. Then, a movement cost between the tuple to be moved and the optimum partition is determined according to an adjustment relationship between the tuple to be moved and the optimum partition. For example, when the optimum partitioning scheme is adjusted to obtain the first partitioning scheme, C2 needs to be moved out of the optimum partition P2 and C3 needs to be moved out of the optimum partition P1. In this case, there are adjustment relationships between P2 and C2 and between P1 and C3, and a specific value of the movement cost may be preset. For example, tuple C2 includes a lot of data, and moving data in C2 requires a high resource cost. Therefore, the value of the movement cost of C2 may be set to a greater value to correspond to the resource cost required by the adjustment process.

After the movement cost is determined, a split cost between the tuple to be moved and the optimum partition also needs to be determined according to the foregoing adjusted tuple split cost information, and tuple movement cost information is generated according to the movement cost and the split cost.

Figure 6:
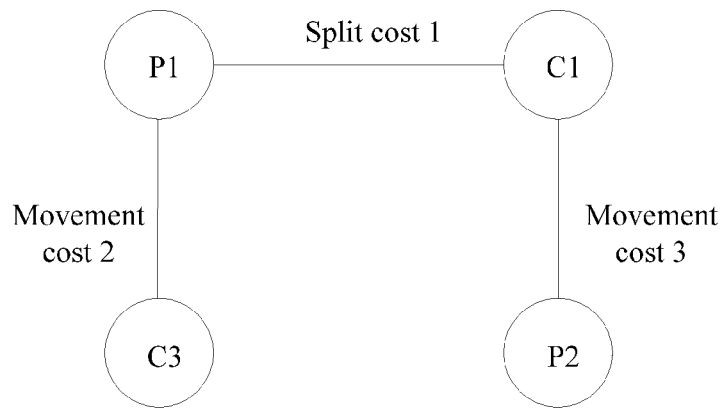
FIG. 6 is a schematic diagram of tuple movement cost information according to Embodiment 3 of the present invention.

Specifically, FIG. 6 is a schematic diagram of tuple movement cost information in Embodiment 3 of the present invention. As shown in FIG. 6, the first partitioning scheme can be obtained only by moving C2 out of P2 and moving C3 out of P1; then, connection relationships between C2 and P2 and between C3 and P1 represents movement costs, but there is a split cost between C2 and S1 in P1. In this case, the split cost between C2 and S1 in P1 is a split cost between the tuple C2 to be moved and the optimum partition P1.

S306. Determine an adjusted partitioning scheme according to the adjusted tuple movement cost information.

The foregoing tuple movement cost information may also be represented by a relationship diagram. In this relationship diagram, an adjustment relationship between a tuple to be moved and an optimum partition and a transaction correlation between a tuple to be moved and a tuple in an optimum partition are represented by connection lines. In this case, multiple types of segmentation processing may be performed on the tuple movement cost information using the image segmentation algorithm to determine multiple preset movement partitioning schemes. Specifically, for any one partitioning scheme, there is always a split cost value. For example, for currently received mixed loads, the split cost value of the optimum partitioning scheme is 10, whereas the split cost value of the first partitioning scheme is 4. In this case, the optimum partitioning scheme is adjusted to the first partitioning scheme to reduce the split cost value. However, according to the movement cost information, it may be known that if the optimum partitioning scheme is adjusted to obtain the first partitioning scheme, a movement cost of 5 needs to be paid. According to 10−4+5=11, a total cost value raised in the adjustment process on the first partitioning scheme is 11. It may be known by analysis that a movement cost of 5 needs to be paid to reduce a split cost value of 4, which is a resource-wasting adjustment. However, in order that a partitioning scheme of the database is applicable to current mixed loads, the optimum partitioning scheme may be adjusted to a preset movement partitioning scheme.

Specifically, multiple types of segmentation processing may be performed on the tuple movement cost information using the image segmentation algorithm, to determine multiple preset movement partitioning schemes, where the multiple preset movement partitioning schemes include the optimum partitioning scheme (that is, no adjustment is performed, and the foregoing optimum partitioning scheme continues to be used), the first partitioning scheme or multiple partitioning schemes obtained by adjusting some tuples, for example, P1″ (S1) and P2″ (C1, C2, and C3).

After multiple preset movement partitioning schemes are obtained, a preset movement partitioning scheme with a minimum adjusted total cost value needs to be determined from the multiple preset movement partitioning schemes and used as the optimum partitioning scheme. Specifically, adjusted total cost values corresponding to the multiple preset movement schemes are obtained using the image segmentation algorithm, that is, an adjusted total cost value raised on a preset movement partitioning scheme is calculated in a process of adjusting the adjusted optimum partitioning scheme to be the preset movement partitioning scheme. Finally, a preset movement partitioning scheme with a minimum adjusted total cost value is determined from the multiple preset movement partitioning schemes and used as the adjusted partitioning scheme.

In this embodiment, after optimum partitioning is performed on a database system, if a load input by a user is changed during the use of the database system, existing partitions in the database system are adjusted according to the load input by the user; and a movement cost needed by the adjustment is also considered during the adjustment to ensure that an optimum partitioning scheme is obtained at a minimum movement cost. In this way, when different loads access data in the database system, these loads can obtain higher access efficiency, thereby improving working performance of the database system oriented to mixed loads.

In actual applications, the foregoing method cannot be used to partition the data in the database due to some objective factors. However, in order that a partitioning scheme of the database system is applicable to the mixed loads, a partitioning scheme applicable to the mixed loads may be determined from existing partitioning schemes used by the database system and with reference to the partitioning schemes determined using the foregoing method.

Figure 7:
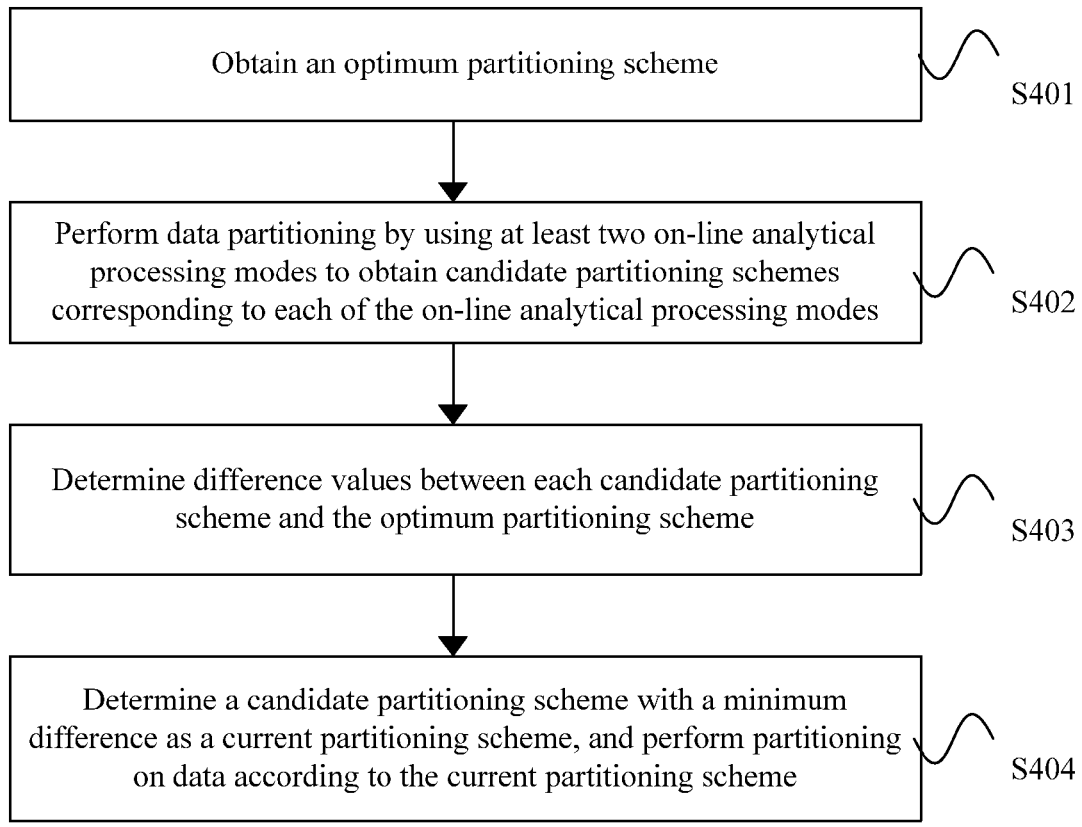
FIG. 7 is a flowchart of Embodiment 4 of a data partitioning method according to the present invention.

FIG. 7 is a flowchart of Embodiment 4 of a data partitioning method of the present invention. As shown in FIG. 7, this embodiment provides a data partitioning method implemented after partitioning processing according to the optimum partitioning scheme determined in Embodiment 1 or Embodiment 2 on data in the database fails. The method includes:

S401. Obtain an optimum partitioning scheme.

In some devices, the method described in S201 to S209 is possibly not supported. To rationalize data partitions in a device, the data partitioning apparatus that executes Embodiment 2 may be externally connected to the device. The data partitioning apparatus obtains an optimum partitioning scheme according to the mixed loads received by the device and data structure information of the device. Specific processes are consistent with S201 to S209, which are not further described herein.

S402. Perform data partitioning using at least two on-line analytical processing modes to obtain candidate partitioning schemes corresponding to each of the on-line analytical processing modes.

The foregoing on-line analytical processing modes are, for example, hash function processing, permutation function processing, round-robin algorithm processing, and replica management processing, which pertain to the prior art, and the on-line analytical processing modes may be used in the foregoing device to obtain candidate partitioning schemes corresponding to each of the on-line analytical processing mode.

S403. Determine difference values between each candidate partitioning scheme and the optimum partitioning scheme.

The foregoing optimum partitioning scheme is represented by S; then, $S=(P_1, P_1, P_2, \ldots P_j \ldots)$, where $P_j$ represents a $j^{th}$ partition in the optimum partitioning scheme.

A candidate partitioning scheme is represented by $S_i$, where i represents the number of one partitioning scheme of multiple candidate partitioning schemes, and then $S_i=(P_{i,1}, P_{i,2}, P_{i,3}, \ldots P_{i,j} \ldots)$, where $P_{i,j}$ represents a $j^{th}$ partition of a partitioning scheme i and i∈M, where M represents a total quantity of candidate partitioning schemes.

Tuples in the foregoing partition $P_j$ are represented by $(t_1, t_2 \ldots t_j \ldots)$, and tuples in $P_{i,j}$ are represented by $(t_{i,1}, t_{i,2} \ldots t_{i,j} \ldots)$.

A difference value between S and each candidate partitioning scheme $S_i$ is calculated, where the difference value is represented by $D_i$; then, $D_i=|S-S_i|=\Sigma|P_j-P_{i,j}|=\Sigma\Sigma(t_j \oplus t_{i,j})$.

S404. Determine a candidate partitioning scheme with a minimum difference value as a current partitioning scheme, and perform partitioning on data according to the current partitioning scheme.

After the difference value $D_i$ between the optimum partitioning scheme and each candidate partitioning scheme is calculated, a partitioning scheme with a minimum difference value is determined as an optimum partitioning scheme that can be selected by the device.

In this embodiment, with reference to an actual situation, when data in a database system is partitioned, an optimum partitioning scheme obtained using an image segmentation algorithm may be flexibly used as a reference standard; a candidate partitioning scheme closest to the reference standard is selected from candidate partitioning schemes obtained using an existing method, so that when the database system can use the existing method, the mixed loads can have higher access efficiency. Therefore, a case in which a partitioning scheme that facilitates access by the mixed loads cannot be obtained using the existing method due to objective factors such as non-support of the device, is avoided.

Figure 8:
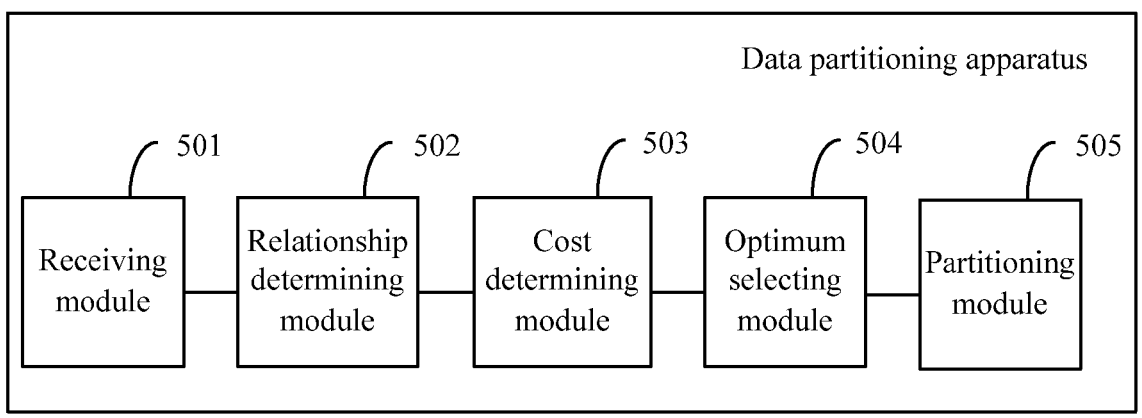
FIG. 8 is a structural diagram of Embodiment 1 of a data partitioning apparatus according to the present invention.

FIG. 8 is a structural diagram of Embodiment 1 of a data partitioning apparatus of the present invention. As shown in FIG. 8, the data partitioning apparatus includes: a receiving module 501 configured to receive mixed loads and structure information of a database that are input by a user, where the mixed loads include at least one transaction load and/or at least one analytical load, and the structure information of the database includes at least one tuple associated with the mixed loads; a relationship determining module 502 configured to determine tuple relationship information according to the mixed loads and the structure information of the database, where the tuple relationship information includes a transaction correlation between any two tuples in the structure information of the database; a cost determining module 502 configured to determine tuple split cost information according to the tuple relationship information and a feature about whether the mixed loads are executable in parallel, where the tuple split cost information includes a split cost between any two tuples having a transaction correlation in the structure information of the database, and the split cost is used to indicate a degree of an impact on efficiency of the mixed loads in accessing the two tuples having the transaction correlation when the two tuples having the transaction correlation are stored in different partitions; an optimum selecting module 504 configured to obtain multiple partitioning schemes according to the tuple split cost information, and determine, from the partitioning schemes, a partitioning scheme with a minimum total cost value as an optimum partitioning scheme, where a total cost value of each partitioning scheme is a sum of split costs between tuples having transaction correlations in the structure information of the database when the partitioning scheme is used; and a partitioning module 505 configured to perform, according to the optimum partitioning scheme, partitioning processing on data stored in the database.

In this embodiment, according to a feature about whether mixed loads are executable in parallel and using an image segmentation algorithm, optimum partitioning is performed on data associated with the mixed loads in a database, and after partitioning, data has features of a transaction load and an analytical load in the mixed loads so that when different loads access data in a database system, the loads can obtain higher access efficiency, thereby improving working performance of the database system oriented to the mixed loads.

Figure 9:
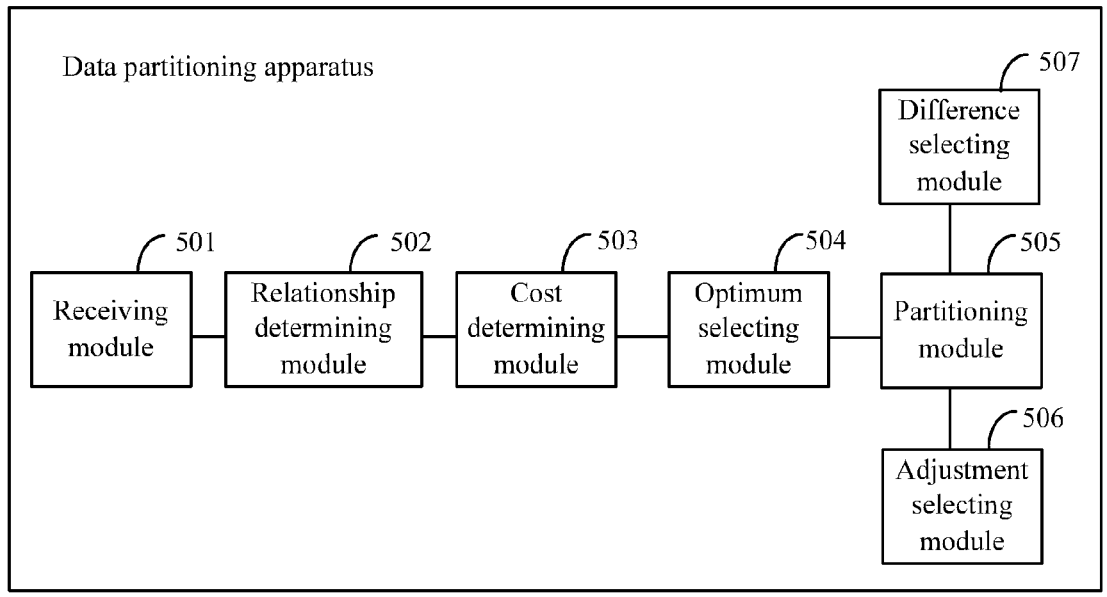
FIG. 9 is a structural diagram of Embodiment 2 of a data partitioning apparatus according to the present invention.

FIG. 9 is a structural diagram of Embodiment 2 of a data partitioning apparatus of the present invention. As shown in FIG. 9, the relationship determining module 502 is configured to separately determine, in sequence according to each load included in the mixed loads, all tuples associated with the each load, in the structure information of the database; determine, according to transaction correlation between any two tuples of all tuples associated with each load, relationship sub-information between tuples associated with the load; and gather relationship sub-information between tuples associated with each load in the mixed loads to obtain the tuple relationship information.

The cost determining module 503 is configured to, if the feature is that the mixed loads which are associated with two tuples having a transaction correlation in the tuple relationship information are not executable in parallel, determine that a split cost between the two tuples is a preset positive value; and if the feature is that the mixed loads which are associated with two tuples having a transaction correlation in the tuple relationship information are executable in parallel, determine that a split cost between the two tuples is a preset negative value.

The tuple split cost information is represented by a relationship diagram and any two tuples having a transaction correlation in the relationship diagram are connected by a connection line; and the foregoing optimum selecting module 504 is configured to perform multiple types of segmentation processing on the relationship diagram using an image segmentation algorithm to determine multiple partitioning schemes, where each type of segmentation processing corresponds to one partitioning scheme; when each type of segmentation processing is performed on the relationship diagram, accumulate split costs between two tuples which are connected by each segmented connection line, to obtain a total cost value of a partitioning scheme corresponding to this type of segmentation processing; and determine a partitioning scheme corresponding to a minimum total cost value as an optimum partitioning scheme.

The apparatus further includes an adjustment selecting module 506, which is configured to, after the partitioning module 505 performs partitioning processing on the data in the database according to the optimum partitioning scheme, when the tuple split cost information is updated to adjusted tuple split cost information, perform multiple types of segmentation processing on the adjusted tuple split cost information using the image segmentation algorithm to determine multiple partitioning schemes, where each type of segmentation processing corresponds to one partitioning scheme, and determine a total cost value of each partitioning scheme, where the adjusted tuple split cost information is represented by a relationship diagram, and any two tuples having a transaction correlation in the relationship diagram are connected by a connection line; determine a partitioning scheme corresponding to a minimum total cost value as a first partitioning scheme; and generate tuple movement cost information according to the optimum partitioning scheme and the first partitioning scheme, and determine an adjusted partitioning scheme according to the tuple movement cost information.

Further, the adjustment selecting module 506 is configured to, when the optimum partitioning scheme is adjusted according to the first partitioning scheme, determine a tuple to be moved in each optimum partition, where the optimum partition is a storage area determined according to the optimum partitioning scheme; and is further configured to determine a movement cost between the tuple to be moved and the optimum partition according to an adjustment relationship between the tuple to be moved and the optimum partition; determine a split costs between the tuple to be moved and the optimum partition according to the tuple split cost information; generate tuple movement cost information according to the movement cost and the split cost; adjust the optimum partitioning scheme according to the tuple movement cost information to obtain multiple preset movement partitioning schemes; obtain an adjusted total cost value corresponding to each of the preset movement partitioning schemes using the image segmentation algorithm; and determine, from the multiple preset movement partitioning schemes, a preset movement partitioning scheme with a minimum adjusted total cost value as the adjusted partitioning scheme.

More flexibly, the apparatus may further include a difference selecting module 507, which is configured to, when the partitioning module 505 fails to perform partitioning processing on the data in the database according to the optimum partitioning scheme, perform data partitioning using at least two on-line analytical processing modes to obtain candidate partitioning schemes corresponding to each on-line analytical processing mode, where the foregoing on-line analytical processing modes are the prior art, for example, hash function processing, permutation function processing, round-robin algorithm processing, and replica management processing; determine difference values between each candidate partitioning scheme and the optimum partitioning scheme; and determine a candidate partitioning scheme with a minimum difference value as a current partitioning scheme, and perform partitioning on the data according to the current partitioning scheme.

In this embodiment, according to a feature about whether mixed loads are executable in parallel and using an image segmentation algorithm, optimum partitioning is performed on data associated with the mixed loads in a database, and after portioning, data has features of a transaction load and an analytical load in the mixed loads, so that when different loads access data in a database system, the loads can obtain higher access efficiency, thereby improving working performance of the database system oriented to the mixed loads.

Each module in each of the foregoing apparatus embodiments corresponds to each method embodiment, which is not further described herein.

Figure 10:
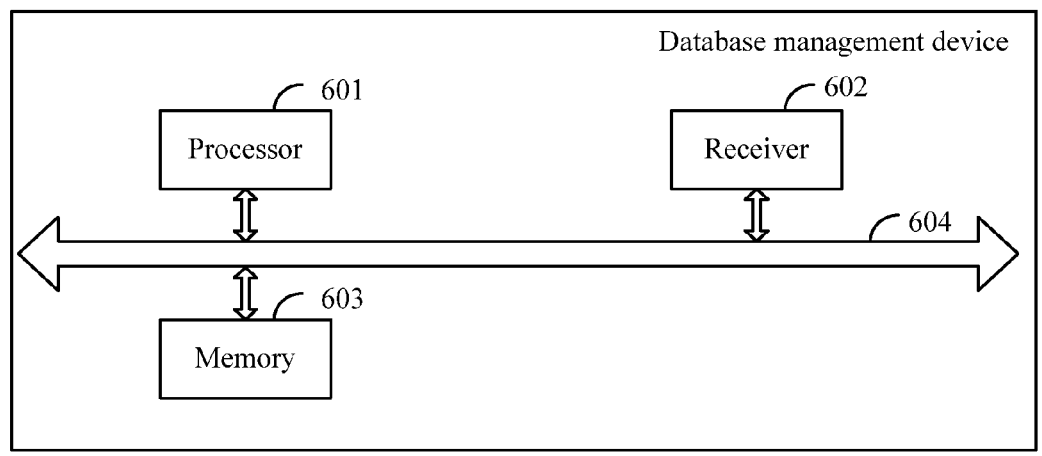
FIG. 10 is a structural diagram of Embodiment 1 of a database management device according to the present invention.

Further, in actual applications, the foregoing data partitioning apparatus may be a database management device. FIG. 10 is a structural diagram of Embodiment 1 of a database management device of the present invention. As shown in FIG. 10, the database management device includes a processor 601, a receiver 602, a memory 603, and a bus 604.

The processor 601, the receiver 602, and the memory 603 are mutually connected using the bus 604. The bus 604 may be an Industry Standard Architecture (ISA) bus, a Peripheral Component Interconnect (PCI) bus, an Extended ISA (EISA) bus, and like. The bus may be categorized into an address bus, a data bus, a control bus, and the like. For ease of representation, the bus in FIG. 10 is represented by one solid line only, but it does not indicate that there is only one bus or one type of bus.

The memory 603 is configured to store a program and data. Specifically, the program may include a program code, where the program code includes computer operation instructions. The memory 603 may include a high-speed random access memory (RAM) memory, and may also include a non-volatile memory, for example, at least one magnetic disk memory. The processor 601 executes the program stored in the memory 603. Specifically, in the database management device, the receiver 602 is configured to receive mixed loads and structure information of a database that are input by a user, where the mixed loads include at least one transaction load and/or at least one analytical load, and the structure information of the database includes at least one tuple associated with the mixed loads, which are stored by the memory 603.

The processor 601 is configured to determine tuple relationship information according to the mixed loads and the structure information of the database, where the tuple relationship information includes a transaction correlation between any two tuples in the structure information of the database.

The processor 601 is configured to determine tuple split cost information according to the tuple relationship information and a feature about whether the mixed loads are executable in parallel, where the tuple split cost information includes a split cost between any two tuples having a transaction correlation in the structure information of the database, and the split cost is used to indicate a degree of an impact on efficiency of the mixed loads in accessing the two tuples having the transaction correlation when the two tuples having the transaction correlation are stored in different partitions.

The processor 601 is configured to obtain multiple partitioning schemes according to the tuple split cost information, and determine, from the partitioning schemes, a partitioning scheme with a minimum total cost value as an optimum partitioning scheme, where a total cost value of each partitioning scheme is a sum of split costs between tuples having transaction correlations in the structure information of the database when the partitioning scheme is used.

The processor 601 is configured to perform, according to the optimum partitioning scheme, partitioning processing on data stored in the database.

Further, the processor 601 separately determines, in sequence according to each load included in the mixed loads, all tuples associated with the each load, in the structure information of the database.

The processor 601 determines, according to a transaction correlation between any two tuples of all tuples associated with each load, relationship sub-information between tuples associated with the load.

The processor 601 gathers relationship sub-information between tuples associated with each load in the mixed loads to obtain the tuple relationship information.

If the feature is that the mixed loads which are associated with two tuples a having transaction correlation in the tuple relationship information are not executable in parallel, the processor 601 determines that a split cost between the two tuples is a preset positive value.

If the feature is that the mixed loads which are associated with two tuples having a transaction correlation in the tuple relationship information are executable in parallel the processor 601 determines that a split cost between the two tuples is a preset negative value.

The tuple split cost information is represented by a relationship diagram and any two tuples having a transaction correlation in the relationship diagram are connected by a connection line.

Further, the processor 601 performs multiple types of segmentation processing on the relationship diagram using an image segmentation algorithm to determine multiple partitioning schemes, where each type of segmentation processing corresponds to one partitioning scheme.

When performing each type of segmentation processing on the relationship diagram, the processor 601 accumulates split costs between two tuples which are connected by each segmented connection line, to obtain a total cost value of a partitioning scheme corresponding to this type of segmentation processing.

The processor 601 determines a partitioning scheme corresponding to a minimum total cost value as an optimum partitioning scheme.

Further, after partitioning processing is performed on the data in the database according to the optimum partitioning scheme, when the tuple split cost information is updated to adjusted tuple split cost information, the processor 601 performs multiple types of segmentation processing on the adjusted tuple split cost information using the image segmentation algorithm to determine multiple partitioning schemes, where each type of segmentation processing corresponds to one partitioning scheme, and determines a total cost value of each partitioning scheme, where the adjusted tuple split cost information is represented by a relationship diagram, and any two tuples having a transaction correlation in the relationship diagram are connected by a connection line.

The processor 601 determines a partitioning scheme corresponding to a minimum total cost value as a first partitioning scheme.

The processor 601 generates tuple movement cost information according to the optimum partitioning scheme and the first partitioning scheme, and determines an adjusted partitioning scheme according to the tuple movement cost information.

Further, the processor 601 of the database management device is configured to, when the optimum partitioning scheme is adjusted according to the first partitioning scheme, determine a tuple to be moved in each optimum partition, where the optimum partition is a storage area determined according to the optimum partitioning scheme.

The processor 601 is further configured to determine a movement cost between the tuple to be moved and the optimum partition according to an adjustment relationship between the tuple to be moved and the optimum partition.

The processor 601 determines a split cost between the tuple to be moved and the optimum partition according to the tuple split cost information.

The processor 601 generates tuple movement cost information according to the movement cost and the split cost.

The processor 601 adjusts the optimum partitioning scheme according to the tuple movement cost information to obtain multiple preset movement partitioning schemes.

The processor 601 obtains an adjusted total cost value corresponding to each of the preset movement partitioning schemes using the image segmentation algorithm.

The processor 601 determines, from the multiple preset movement partitioning schemes, a preset movement partitioning scheme with a minimum adjusted total cost value as the adjusted partitioning scheme.

The processor 601 is further configured to, when partitioning processing on the data in the database according to the optimum partitioning scheme fails, perform data partitioning using at least two on-line analytical processing modes to obtain candidate partitioning schemes corresponding to each of the on-line analytical processing modes; determine difference values between each candidate partitioning scheme and the optimum partitioning scheme; and determine a candidate partitioning scheme with a minimum difference value as a current partitioning scheme, and perform partitioning on the data according to the current partitioning scheme, where the foregoing on-line analytical processing modes are the prior art, for example, hash function processing, permutation function processing, round-robin algorithm processing, and replica management processing.

In this embodiment, according to a feature about whether mixed loads are executable in parallel and using an image segmentation algorithm, a database management device performs optimum partitioning on data associated with the mixed loads in a database, after partitioning, data has features of a transaction load and an analytical load in the mixed loads, so that when different loads access data in a database system, the loads can obtain higher access efficiency, thereby improving working performance of the database system oriented to the mixed loads.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a read only memory (ROM), a RAM, a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A data partitioning method, comprising:
receiving mixed loads and structure information of a database that are input by a user, wherein the mixed loads comprise at least one transaction load and/or at least one analytical load, and wherein the structure information of the database comprises at least one tuple associated with the mixed loads;
determining tuple relationship information according to the mixed loads and the structure information of the database, wherein the tuple relationship information comprises a transaction correlation between any two tuples in the structure information of the database;
determining tuple split cost information according to the tuple relationship information and a feature about whether the mixed loads are executable in parallel, wherein the tuple split cost information comprises a split cost between any two tuples having a transaction correlation in the structure information of the database, and wherein the split cost is used to indicate a degree of an impact on efficiency of the mixed loads in accessing the two tuples having the transaction correlation when the two tuples having the transaction correlation are stored in different partitions;

obtaining multiple partitioning schemes according to the tuple split cost information;

determining, from the partitioning schemes, that a partitioning scheme with a minimum total cost value is an optimum partitioning scheme, wherein a total cost value of each partitioning scheme is a sum of split costs between tuples having transaction correlations in the structure information of the database when the partitioning scheme is used; and performing, according to the optimum partitioning scheme, partitioning processing on data stored in the database.

2. The data partitioning method according to claim 1, wherein determining the tuple relationship information according to the mixed loads and the structure information of the database comprises:

separately determining, according to each load comprised in the mixed loads, all tuples associated with the each load, in the structure information of the database;

determining, according to a transaction correlation between any two tuples of all tuples associated with each load, relationship sub-information between tuples associated with the load; and gathering relationship sub-information between tuples associated with each load in the mixed loads to obtain the tuple relationship information.

3. The data partitioning method according to claim 2, wherein determining tuple split cost information according to the tuple relationship information and the feature about whether the mixed loads are executable in parallel comprises determining that a split cost between the two tuples is a preset positive value when the feature is that the mixed loads which are associated with two tuples having a transaction correlation in the tuple relationship information are not executable in parallel.

4. The data partitioning method according to claim 2, wherein determining tuple split cost information according to the tuple relationship information and the feature about whether the mixed loads are executable in parallel comprises determining that a split cost between the two tuples is a preset negative value when the feature is that the mixed loads which are associated with two tuples having a transaction correlation in the tuple relationship information are executable in parallel.

5. The data partitioning method according to claim 4, wherein the tuple split cost information is represented by a relationship diagram, wherein any two tuples having a transaction correlation in the relationship diagram are connected by a connection line, wherein obtaining multiple partitioning schemes according to the tuple split cost information and determining that the partitioning scheme with the minimum total cost value is the optimum partitioning scheme comprise:

performing multiple types of segmentation processing on the relationship diagram using an image segmentation algorithm to determine multiple partitioning schemes, wherein each type of segmentation processing corresponds to one partitioning scheme;

accumulating split costs between two tuples which are connected by each segmented connection line to obtain a total cost value of a partitioning scheme corresponding to this type of segmentation processing when each type of segmentation processing is performed on the relationship diagram; and determining a partitioning scheme corresponding to a minimum total cost value as an optimum partitioning scheme.

6. The data partitioning method according to claim 4, wherein after partitioning processing is performed on the data in the database according to the optimum partitioning scheme, the method further comprises:

performing multiple types of segmentation processing on the adjusted tuple split cost information using the image segmentation algorithm to determine multiple partitioning schemes when the tuple split cost information is updated to adjusted tuple split cost information, wherein each type of segmentation processing corresponds to one partitioning scheme;

determining a total cost value of each partitioning scheme, wherein the adjusted tuple split cost information is represented by a relationship diagram, and wherein any two tuples having a transaction correlation in the relationship diagram are connected by a connection line;

determining a partitioning scheme corresponding to a minimum total cost value as a first partitioning scheme;

generating tuple movement cost information according to the optimum partitioning scheme and the first partitioning scheme; and determining an adjusted partitioning scheme according to the tuple movement cost information.

7. The data partitioning method according to claim 6, wherein generating tuple movement cost information according to the optimum partitioning scheme and the first partitioning scheme, and determining an adjusted partitioning scheme according to the tuple movement cost information comprise:

determining a tuple to be moved in each optimum partition when the optimum partitioning scheme is adjusted according to the first partitioning scheme, wherein the optimum partition is a storage area determined according to the optimum partitioning scheme;

determining a movement cost between the tuple to be moved and the optimum partition according to an adjustment relationship between the tuple to be moved and the optimum partition;

determining a split cost between the tuple to be moved and the optimum partition according to the adjusted tuple split cost information;

generating tuple movement cost information according to the movement cost and the split cost;

adjusting the optimum partitioning scheme according to the tuple movement cost information to obtain multiple preset movement partitioning schemes;

obtaining an adjusted total cost value corresponding to each of the preset movement partitioning schemes using the image segmentation algorithm; and determining, from the multiple preset movement partitioning schemes, a preset movement partitioning scheme with a minimum adjusted total cost value as the adjusted partitioning scheme.

8. The data partitioning method according to claim 1, wherein when partitioning processing on the data in the database according to the optimum partitioning scheme fails, the method further comprises:

performing data partitioning using at least two on-line analytical processing modes to obtain candidate partitioning schemes corresponding to each of the on-line analytical processing modes;

determining difference values between each candidate partitioning scheme and the optimum partitioning scheme;

determining a candidate partitioning scheme with a minimum difference value as a current partitioning scheme; and performing partitioning on the data according to the current partitioning scheme.

9. The data partitioning method according to claim 8, wherein the at least two on-line analytical processing modes comprise at least two of the following on-line analytical processing modes: hash function processing, permutation function processing, round-robin algorithm processing, and replica management processing.

10. A data partitioning apparatus, comprising:
a computer processor configured to:
receive mixed loads and structure information of a database that are input by a user, wherein the mixed loads comprise at least one transaction load and/or at least one analytical load, and wherein the structure information of the database comprises at least one tuple associated with the mixed loads;

determine tuple relationship information according to the mixed loads and the structure information of the database, wherein the tuple relationship information comprises a transaction correlation between any two tuples in the structure information of the database;

determine tuple split cost information according to the tuple relationship information and a feature about whether the mixed loads are executable in parallel, wherein the tuple split cost information comprises a split cost between any two tuples having a transaction correlation in the structure information of the database, and wherein the split cost is used to indicate a degree of an impact on efficiency of the mixed loads in accessing the two tuples having the transaction correlation when the two tuples having the transaction correlation are stored in different partitions;

obtain multiple partitioning schemes according to the tuple split cost information; and determine, from the partitioning schemes, a partitioning scheme with a minimum total cost value as an optimum partitioning scheme, wherein a total cost value of each partitioning scheme is a sum of split costs between tuples having transaction correlations in the structure information of the database when the partitioning scheme is used; and perform, according to the optimum partitioning scheme, partitioning processing on data stored in the database.

11. The data partitioning apparatus according to claim 10, wherein the computer processor is configured to:
separately determine, according to each load comprised in the mixed loads, all tuples associated with the each load, in the structure information of the database;

determine, according to a transaction correlation between any two tuples of all tuples associated with each load, relationship sub-information between tuples associated with the load; and gather relationship sub-information between tuples associated with each load in the mixed loads to obtain the tuple relationship information.

12. The data partitioning apparatus according to claim 10, wherein the computer processor is configured to:
determine that a split cost between the two tuples is a preset positive value when the feature is that the mixed loads which are associated with two tuples having a transaction correlation in the tuple relationship information are not executable in parallel; and determine that a split cost between the two tuples is a preset negative value when the feature is that the mixed loads which are associated with two tuples having a transaction correlation in the tuple relationship information are executable in parallel.

13. The data partitioning apparatus according to claim 12, wherein the tuple split cost information is represented by a relationship diagram and any two tuples having a transaction correlation in the relationship diagram are connected by a connection line, wherein the computer processor is configured to:
perform multiple types of segmentation processing on the relationship diagram using an image segmentation algorithm to determine multiple partitioning schemes, wherein each type of segmentation processing corresponds to one partitioning scheme;

accumulate split costs between two tuples which are connected by each segmented connection line to obtain a total cost value of a partitioning scheme corresponding to this type of segmentation processing when each type of segmentation processing is performed on the relationship diagram; and determine a partitioning scheme corresponding to a minimum total cost value as an optimum partitioning scheme.

14. The data partitioning apparatus according to claim 12, wherein the computer processor is further configured to:
perform multiple types of segmentation processing on the adjusted tuple split cost information using the image segmentation algorithm to determine multiple partitioning schemes after performing partitioning processing on the data in the database according to the optimum partitioning scheme and when the tuple split cost information is updated to adjusted tuple split cost information, wherein each type of segmentation processing corresponds to one partitioning scheme;

determine a total cost value of each partitioning scheme, wherein the adjusted tuple split cost information is represented by a relationship diagram, and wherein any two tuples having a transaction correlation in the relationship diagram are connected by a connection line;

determine a partitioning scheme corresponding to a minimum total cost value as a first partitioning scheme; and generate tuple movement cost information according to the optimum partitioning scheme and the first partitioning scheme, and determine an adjusted partitioning scheme according to the tuple movement cost information.

15. The data partitioning apparatus according to claim 14, wherein the computer processor is further configured to:
determine a tuple to be moved in each optimum partition when the optimum partitioning scheme is adjusted according to the first partitioning scheme, wherein the optimum partition is a storage area determined according to the optimum partitioning scheme;

determine a movement cost between the tuple to be moved and the optimum partition according to an adjustment relationship between the tuple to be moved and the optimum partition;

determine a split cost between the tuple to be moved and the optimum partition according to the adjusted tuple split cost information;

generate tuple movement cost information according to the movement cost and the split cost;

adjust the optimum partitioning scheme according to the tuple movement cost information to obtain multiple preset movement partitioning schemes;

obtain an adjusted total cost value corresponding to each of the preset movement partitioning schemes using the image segmentation algorithm; and determine, from the multiple preset movement partitioning schemes, a preset movement partitioning scheme with a minimum adjusted total cost value as the adjusted partitioning scheme.

16. The data partitioning apparatus according to claim 10, wherein the computer processor is further configured to:

perform data partitioning using at least two on-line analytical processing modes to obtain candidate partitioning schemes corresponding to each of the on-line analytical processing modes when partitioning processing fails to be performed on the data in the database according to the optimum partitioning scheme;

determine difference values between each candidate partitioning scheme and the optimum partitioning scheme;

determine a candidate partitioning scheme with a minimum difference value as a current partitioning scheme; and perform partitioning on the data according to the current partitioning scheme.

17. A database management device configured to perform data partitioning on a database, the device comprising:

a processor;

a memory configured to store an executable program;

a receiver configured to receive mixed loads and structure information of the database that are input by a user, wherein the mixed loads include at least one transaction load and/or at least one analytical load, and wherein the structure information of the database includes at least one tuple associated with the mixed loads, which are stored by the memory;

a bus, wherein the processor, the receiver, and the memory are mutually connected using the bus, and wherein the processor is configured to execute the program stored in the memory so as to:

determine tuple relationship information according to the mixed loads and the structure information of the database, wherein the tuple relationship information comprises a transaction correlation between any two tuples in the structure information of the database;

determine tuple split cost information according to the tuple relationship information and a feature about whether the mixed loads are executable in parallel, wherein the tuple split cost information comprises a split cost between any two tuples having a transaction correlation in the structure information of the database, and wherein the split cost is used to indicate a degree of an impact on efficiency of the mixed loads in accessing the two tuples having the transaction correlation when the two tuples having the transaction correlation are stored in different partitions;

obtain multiple partitioning schemes according to the tuple split cost information; and determine, from the partitioning schemes, a partitioning scheme with a minimum total cost value as an optimum partitioning scheme, wherein a total cost value of each partitioning scheme is a sum of split costs between tuples having transaction correlations in the structure information of the database when the partitioning scheme is used; and perform, according to the optimum partitioning scheme, partitioning processing on data stored in the database.

18. The database management device according to claim 17, wherein the processor executes the program stored in the memory so as to:

separately determine, according to each load comprised in the mixed loads, all tuples associated with the each load, in the structure information of the database;

determine, according to a transaction correlation between any two tuples of all tuples associated with each load, relationship sub-information between tuples associated with the load; and gather relationship sub-information between tuples associated with each load in the mixed loads to obtain the tuple relationship information.

19. The database management device according to claim 18, wherein the processor executes the program stored in the memory so as to:

determine that a split cost between the two tuples is a preset positive value when the feature is that the mixed loads which are associated with two tuples having a transaction correlation in the tuple relationship information are not executable in parallel; and determine that a split cost between the two tuples is a preset negative value when the feature is that the mixed loads which are associated with two tuples having a transaction correlation in the tuple relationship information are executable in parallel.

20. The database management device according to claim 19, wherein the tuple split cost information is represented by a relationship diagram, wherein any two tuples having a transaction correlation in the relationship diagram are connected by a connection line, and wherein the processor executes the program stored in the memory so as to:

perform multiple types of segmentation processing on the relationship diagram using an image segmentation algorithm to determine multiple partitioning schemes, wherein each type of segmentation processing corresponds to one partitioning scheme;

accumulate split costs between two tuples which are connected by each segmented connection line to obtain a total cost value of a partitioning scheme corresponding to this type of segmentation processing when each type of segmentation processing is performed on the relationship diagram; and determine a partitioning scheme corresponding to a minimum total cost value as an optimum partitioning scheme.

21. The database management device according to claim 19, wherein the processor executes the program stored in the memory so as to:

perform multiple types of segmentation processing on the adjusted tuple split cost information using the image segmentation algorithm to determine multiple partitioning schemes when the tuple split cost information is updated to adjusted tuple split cost information, wherein each type of segmentation processing corresponds to one partitioning scheme;

determine a total cost value of each partitioning scheme, wherein the adjusted tuple split cost information is represented by a relationship diagram, and wherein any two tuples having a transaction correlation in the relationship diagram are connected by a connection line;

determine a partitioning scheme corresponding to a minimum total cost value as a first partitioning scheme;

generate tuple movement cost information according to the optimum partitioning scheme and the first partitioning scheme;

determining an adjusted partitioning scheme according to the tuple movement cost information.

* * * * *